Jan. 27, 1925.
H. P. SPARKES
MEASURING SYSTEM
Filed Nov. 29, 1921
1,524,587
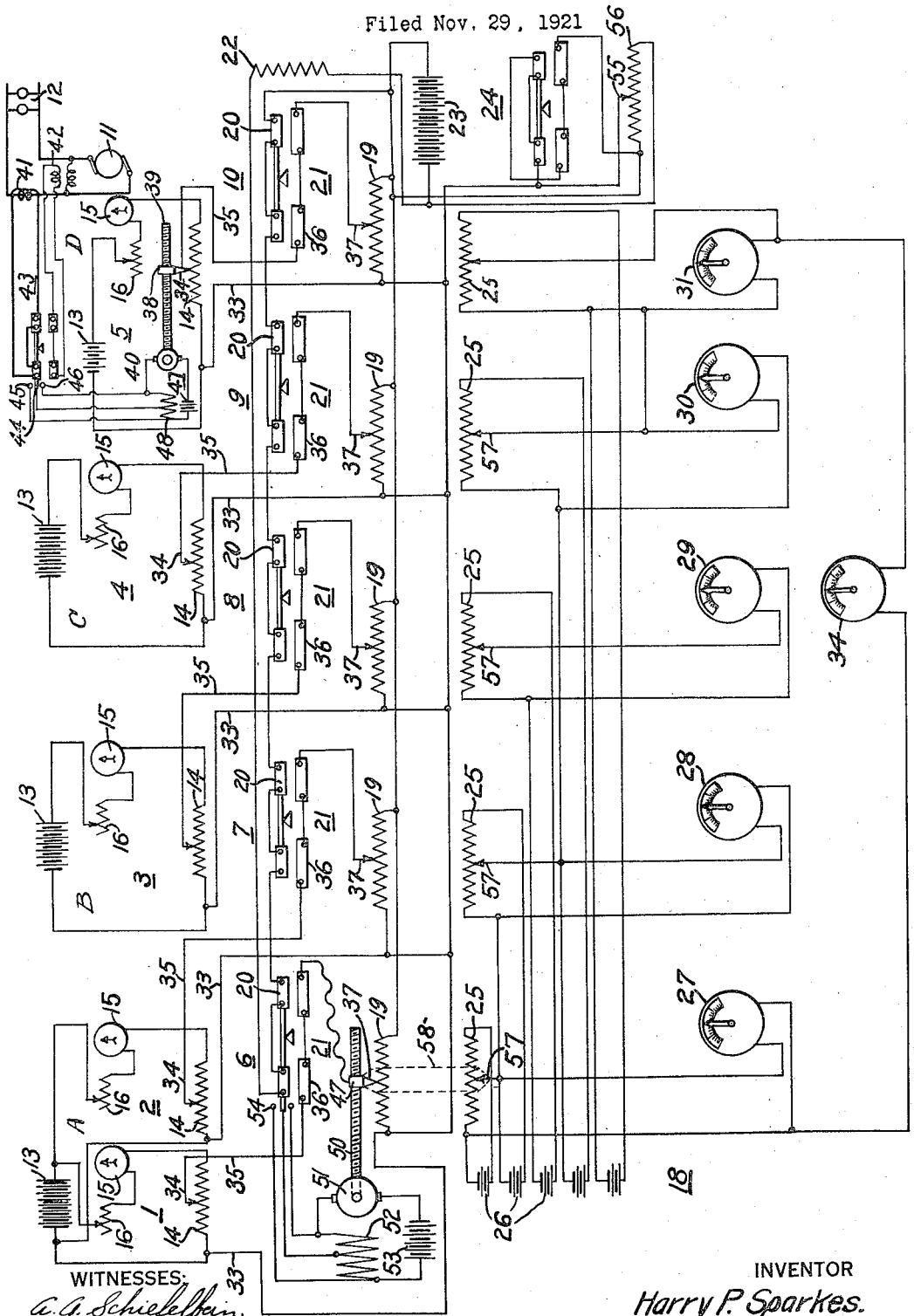
INVENTOR
Harry P. Sparkes.
BY
ATTORNEY
WITNESSES:

Patented Jan. 27, 1925.

1,524,587

UNITED STATES PATENT OFFICE.

HARRY P. SPARKES, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING SYSTEM.

Application filed November 29, 1921. Serial No. 518,738.

*To all whom it may concern:*

Be it it known that I, HARRY P. SPARKES, a citizen of the United States, and a resident of Wilkinsburg, in the county of Allegheny and State of Pennsylvania, have invented a new and useful Improvement in Measuring Systems, of which the following is a specification.

My invention relates to measuring systems and particularly to means for effecting indications of the several and collective loads on a plurality of main circuits at a central or local position.

One object of my invention is to provide a system of the above indicated character that shall be simple and effective in operation.

Another object of my invention is to provide an indicating and measuring system that shall permit the use of ordinary intelligence-transmitting conductors for connecting the indicating means to power systems, without interfering with the usual function of the conductors.

Another object of my invention is to provide a measuring system, of the above indicated character, that shall require very little attention to maintain it in proper working order.

To obtain successful operation of several power and feeder stations, controlled by a load dispatcher who may be located several miles from each station, it is convenient to provide indications of the station loads at the dispatcher's office, in order that he may quickly be apprised of the loads on each station and the total load on the system.

Heretofore, it has been usual for the operators of the several stations to report to the dispatcher over the telephone, resulting in personal errors and, in large and complicated systems, the employment of several operators whose duty was to answer the telephones.

In practicing my invention, I propose to overcome the objections to the above mentioned system by providing means whereby the dispatcher may have instantaneous indications of the loads, on all of the stations which he controls, immediately before him.

By the use of a balanced potentiometer system, I propose to use the ordinary telephone wires, without interfering with their usual function for transmitting messages, as pilot wires for effecting movement of members in the dispatcher's office. The movable members are caused to so vary separately-energized circuits, having instruments therein, as to cause the latter to indicate the loads on the various stations, and, since the latter circuits are separately energized, an instrument for totalizing the loads on a number of the stations may readily be provided.

The single figure of the accompanying drawing is a diagrammatic view of a measuring system embodying my invention.

A system embodying my invention may comprise, in general, a plurality of transmitting devices of which 1 and 2 are located at one power station A, 3 is disposed at a feeder or sub-station B and 4 and 5 are disposed at separate power stations C and D, respectively. The above mentioned devices are connected, respectively, to measuring or receiving devices 6, 7, 8, 9 and 10 at a load dispatcher's office.

For simplicity, the actual power circuits are shown only in connection with the power station D, at which a generator 11 is connected to a load circuit 12.

Each of the power and feeder systems has associated therewith an auxiliary separately-energized circuit comprising a battery 13, a balance resistor 14, an ammeter 15 and a regulating resistor 16.

Each of the measuring devices 6, 7, 8, 9 and 10, at the load dispatcher's office, comprises two separately energized systems 17 and 18, the first comprising a plurality of balance resistors 19, the movable coils 20 of Kelvin balances 21, a series resistor 22, a battery 23 and a Kelvin-balance voltage regulator 24, and the second comprising a plurality of resistors 25, similar to the balance or slide resistors 14 and 19, a battery 26 for each resistor 25 and indicating or measuring instruments 27, 28, 29, 30 and 31, each similar to a usual voltmeter. The instruments 27 and 28 are for indicating the loads on the station A, and the instruments 29, 30 and 31 for indicating the loads on the stations B, C and D, respectively. A totalizing instrument 34 is adapted to indicate the total load on all of the power stations A, C and D, but excludes the sub-station B.

The negative terminals of the balance resistors 14 are connected, through conductors 33, to the negative terminals of the balance resistors 19, and sliding contact members 34, engaging the resistors 14, are connected, by conductors 35, and, through the stationary coils 36 of the Kelvin balances 21, to sliding contact members 37 engaging the resistors 19.

The sliding contact members 34 are each similarly operated, as indicated only at the power station D, by a travelling nut 38 mounted on a screw shaft 39 of a motor 40.

A current transformer 41 and a voltage transformer 42 are connected to the coils of a Kelvin balance 43 to control the motor 40 in accordance with variations in the load circuit 12. This control is effected by the alternate engagement of a movable contact member 44, on the Kelvin balance 43, with stationary contact members 45 and 46. The movable and stationary contact members 44, 45 and 46 are connected to the circuit of the motor 40, which circuit comprises the motor armature, a battery 47 and the motor field windings 48.

Similarly, the sliding contact members 37 are each operated, as indicated only in connection with the measuring device 6, by a traveling nut 47, a screw shaft 50, a motor armature 51, a motor field winding 52, a battery 53 and contact members 54 associated with one of the Kelvin balances 21.

A sliding contact member 55, engaging a resistor 56, is also similarly actuated and controlled by the Kelvin balance 24.

Sliding contact members 57, engaging the resistors 25 of the circuits 18, are each mechanically connected to the sliding contact members 37 of the circuit 17, by any suitable means, such as a rod or bar 58, indicated in broken lines in connection with the measuring device 6.

In the above described system, the negative terminal of each battery 13 is connected to form a series circuit through the conductor 33, the sliding contact member 55 and a portion of the resistor 56, to the negative terminal of the battery 23. The positive terminal of each battery 13 is connected to form a series circuit, through the adjustable resistor 16, the ammeter 15, a portion of the resistor 14, the sliding contact member 34, the conductor 35, the coils 36 of the Kelvin balance 21, the sliding contact member 37 and a portion of the resistor 19, to the positive terminal of the battery 23. Thus, the voltages of the batteries 13 and 23 are in opposition.

With the battery voltages equal and the sliding contact members 34 and 37 in corresponding positions, thus placing equal portions of the resistors 14 and 19 in shunt relation to the series circuits above described between the sliding contact members and the conductor 33, there will be no current flow in the conductors 33 and 35.

When the sliding contact member 34 is moved one way or the other, thus varying the potential drop caused by the battery 13 between the conductors 33 and 35, there will be a flow of current through the coils 36, thus actuating the Kelvin balance and causing the sliding contact 37 to move to a new position, corresponding to the position of the contact member 34, during which movement the potential drop caused by the battery 23 between the conductors 33 and 35 is changed to correspond to the drop caused by the battery 13.

The current which traverses the conductors 33 and 35 during the above-described operation is adjusted to be of such predetermined minor order as to not interfere with the operation of the conductors as telephone, telegraph or other intelligence-transmitting means.

The movable coils 20 of the Kelvin balances 21, are connected in series relation to each other and to the battery 23 to assist in maintaining uniform operating characteristics of the balances.

To further assist in uniform operation of the balances 21, the drops across the resistors 19 caused by the battery 23 must be maintained constant. This feature is obtained by the use of the Kelvin balance 24 which gradually reduces the value of the active portion of the resistor 56 as the voltage of the battery 23 drops. Adjustment of the battery 13 is effected by adjustment of the resistor 16 to maintain the reading of the ammeter 15 constant.

Since the sliding contact members 57 are moved simultaneously with the sliding contact members 37, changes proportional to variations on the loads in the power stations, A, C and D, and the substation B will be immediately effected in the circuits of the instruments 27, 28, 29, 30 and 31. That is, a voltage will be impressed on the various instruments proportional to the movement of the contacts 57 by reason of the fact that constant voltage is impressed across the resistors 25.

Since the circuit 18 is entirely electrically isolated from the other circuits, the instruments 27, 28, 30 and 31 may readily be connected, in series, as shown, to totalize the voltage impressed thereon, and, consequently, the readings thereof in the instrument 32, so that the load dispatcher may conveniently have before him indications of the loads on the individual power and substations and the total load on the power stations.

While I have shown and described a particular form of my invention, changes may be effected therein without departing from the spirit and scope thereof, as set forth in the appended claims.

What I claim as my invention is:

1. The combination with a plurality of main circuits, of a co-operating pair of separately-energized circuits for each main circuit, means for varying the potential drop across a portion of one of the separately-energized circuits of each pair in accordance with load variations in the corresponding main circuit, means for automatically changing the potential drop across a portion of the other separately-energized circuit of each pair in accordance with said first variations, a third separately-energized circuit for each main circuit and means for varying the potential thereof in accordance with the variations in the corresponding co-operating pair of circuits.

2. The combination with a plurality of main circuits, of a co-operating pair of separately-energized circuits for each main circuit, means for varying the potential drop across a portion of one of the separately-energized circuits of each pair in accordance with load variations in the corresponding main circuit, means for automatically changing the potential drop across a portion of the other separately energized circuit of each pair in accordance with said first variation, a third separately energized circuit for each main circuit and means mechanically operated by the corresponding automatic means for varying the potential of each third circuit.

3. The combination with a plurality of main circuits, of a co-operating pair of separately-energized circuits for each main circuit, means for varying the potential drop across a portion of one of the separately energized circuits of each pair in accordance with load variations in the corresponding main circuit, means for automatically changing the potential drop across a portion of the other separately-energized circuit of each pair in accordance with said first variations, a third separately-energized circuit for each main circuit, means for varying the potential thereacross in accordance with potential variations in the corresponding of said pairs of circuits, and an indicating device in each of said third circuits.

4. The combination with a plurality of main circuits, of a co-operating pair of separately-energized circuits for each main circuit, means for varying the potential drop across a portion of one of the separately energized circuits of each pair in accordance with load variations in the corresponding main circuit, means for automatically changing the potential drop across a portion of the other separately-energized circuit of each pair in accordance with said first variations, a third separately-energized circuit for each main circuit, means for varying the potential thereacross in accordance with potential variations in the corresponding of said pairs of circuits, an indicating device in each of said third circuits and a totalizing indicating device connected to a number of said third circuits.

5. The combination with a main circuit, of a separately-energized indicating circuit, a separately-energized circuit intermediate said circuits, mechanically-operated means for varying the potential across the intermediate circuit in accordance with main circuit load variations, and mechanically-operated means for varying the potential across the indicating circuit in accordance with potential variations across the intermediate circuit.

6. The combination with a main circuit, of a separately energized indicating circuit, a separately energized circuit intermediate said circuits responsive to main circuit load variations, and mechanically-operated means for varying the potential across the indicating circuit in accordance with changes in the intermediate circuit.

7. The combination with a main circuit, of two opposing separately-energized auxiliary circuits, an adjustable resistor in each auxiliary circuit, means for adjusting the resistor of one auxiliary circuit in accordance with main-circuit-load variations, means for adjusting the other resistor, a Kelvin balance connected to the auxiliary circuits for controlling the latter adjusting means, an indicating circuit including a resistor, and means mechanically connected to said latter adjusting means for adjusting the indicating circuit resistor.

8. The combination with a main circuit, of a separately energized balanced potential system affected in accordance with main-circuit-load variations, means responsive to changes in said system, and means entirely electrically independent of said circuit and said system and actuated by said responsive means to indicate main-load variations.

9. The combination with a plurality of main circuits and a feeder circuit therefor, of a pair of opposing separately energized circuits for each of said circuits, and an adjustable resistor in each auxiliary circuit, means for adjusting one of each pair of auxiliary-circuit resistors in accordance with load variations in its corresponding main or feeder circuit, means for adjusting the other resistor of each pair of auxiliary resistors, a Kelvin balance connected between the auxiliary circuits of said pairs thereof for controlling the latter adjusting means, an indicating circuit including a resistor for each pair of said auxiliary circuits, means mechanically connected to each of said latter adjusting means for adjusting the indicating-circuit resistors and a totalizing indicating circuit connected to the said indicating circuit corresponding to the main circuits.

In testimony whereof, I have hereunto subscribed my name this 16th day of November 1921.

HARRY P. SPARKES.